United States Patent
Palmer et al.

(10) Patent No.: US 7,337,326 B2
(45) Date of Patent: Feb. 26, 2008

(54) APPARATUS AND METHOD FOR EFFECTING SECURE PHYSICAL AND COMMERCIAL TRANSACTIONS IN A CONTACTLESS MANNER USING BIOMETRIC IDENTITY VALIDATION

(75) Inventors: Glennard D. Palmer, Richardson, TX (US); Ralph O. Doughty, Colleyville, TX (US); Patrick R. Antaki, Plano, TX (US)

(73) Assignee: Innovation Connection Corporation, Richardson, TX (US)

( * ) Notice: Subject to any disclaimer, the term of this patent is extended or adjusted under 35 U.S.C. 154(b) by 564 days.

(21) Appl. No.: 10/400,306

(22) Filed: Mar. 27, 2003

(65) Prior Publication Data

US 2003/0226041 A1   Dec. 4, 2003

Related U.S. Application Data

(60) Provisional application No. 60/368,363, filed on Mar. 28, 2002.

(51) Int. Cl.
*H04L 9/00* (2006.01)
(52) U.S. Cl. .................................... 713/186
(58) Field of Classification Search ........ 363/157–177; 902/24–29; 713/186
See application file for complete search history.

(56) References Cited

U.S. PATENT DOCUMENTS

| | | | |
|---|---|---|---|
| 4,405,829 A | 9/1983 | Rivest et al. | |
| 4,582,985 A | 4/1986 | Lofberg | |
| 4,609,777 A | 9/1986 | Cargile | |
| 4,614,861 A * | 9/1986 | Pavlov et al. ............... | 235/380 |
| 4,720,860 A | 1/1988 | Weiss | |
| 4,791,283 A | 12/1988 | Burkhardt | |
| 4,814,591 A * | 3/1989 | Nara et al. ................... | 235/380 |
| 4,819,267 A | 4/1989 | Cargile et al. | |
| 4,856,062 A | 8/1989 | Weiss | |
| 4,885,778 A | 12/1989 | Weiss | |
| 4,926,480 A | 5/1990 | Chaum | |
| 4,941,173 A | 7/1990 | Boule et al. | |

(Continued)

FOREIGN PATENT DOCUMENTS

EP   0789334   *   8/1997

(Continued)

OTHER PUBLICATIONS

Kisner (W. Kinsner, "Smart Cards", Department of Electrical & Computer Engineering University of Manitoba, Oct. 1999).*

(Continued)

*Primary Examiner*—Kambiz Zand
*Assistant Examiner*—Peter Poltorak
(74) *Attorney, Agent, or Firm*—Haynes and Boone, LLP

(57) ABSTRACT

Provided is an apparatus and method for effecting secure transactions in a contactless manner using biometric identity validation. The apparatus may include, for example, a biometric sensor that is operable to detect biometric information associated with a user of the apparatus. A processor that is accessible to the biometric sensor may be used to process the biometric information to verify the identity of the user. One or more antennae may also form part of the apparatus and may perform multiple functions. For example, the antennae may provide contactless communication with an external device and may also provide receive power from an external power source to power the device.

6 Claims, 14 Drawing Sheets

U.S. PATENT DOCUMENTS

| | | | |
|---|---|---|---|
| 4,972,476 | A | 11/1990 | Nathans |
| 4,993,068 | A | 2/1991 | Piosenka et al. |
| 4,998,279 | A | 3/1991 | Weiss |
| 5,020,105 | A | 5/1991 | Rosen et al. |
| 5,040,223 | A * | 8/1991 | Kamiya et al. ............. 382/127 |
| 5,056,141 | A | 10/1991 | Dyke |
| 5,065,429 | A | 11/1991 | Lang |
| 5,131,038 | A | 7/1992 | Puhl et al. |
| 5,280,527 | A | 1/1994 | Gullman et al. |
| 5,623,552 | A * | 4/1997 | Lane ........................... 382/124 |
| 5,732,148 | A * | 3/1998 | Keagy et al. ................ 382/124 |
| 5,794,218 | A * | 8/1998 | Jennings et al. ............. 705/35 |
| 5,838,059 | A * | 11/1998 | Inoue et al. ................. 257/679 |
| 5,907,142 | A * | 5/1999 | Kelsey ........................ 235/380 |
| 5,943,624 | A * | 8/1999 | Fox et al. ................. 455/556.1 |
| 5,982,628 | A * | 11/1999 | Houdeau et al. ............ 361/760 |
| 5,991,749 | A * | 11/1999 | Morrill, Jr. ................... 705/44 |
| 5,996,897 | A * | 12/1999 | Prancz ........................ 235/492 |
| 6,019,284 | A * | 2/2000 | Freeman et al. ............ 235/380 |
| 6,089,451 | A | 7/2000 | Krause |
| 6,134,130 | A * | 10/2000 | Connell et al. ................ 363/89 |
| 6,219,439 | B1 | 4/2001 | Burger |
| 6,327,376 | B1 * | 12/2001 | Harkin ........................ 382/124 |
| 6,441,482 | B1 | 8/2002 | Foster |
| 6,470,451 | B1 * | 10/2002 | Weinstein .................... 713/185 |
| 6,507,912 | B1 * | 1/2003 | Matyas et al. ............... 713/186 |
| 6,588,660 | B1 * | 7/2003 | Buescher et al. ............ 235/382 |
| 6,848,617 | B1 * | 2/2005 | Fries et al. .................. 235/492 |
| 6,877,097 | B2 * | 4/2005 | Hamid et al. ................ 713/186 |
| 6,980,672 | B2 * | 12/2005 | Saito et al. .................. 382/124 |
| 2002/0095587 | A1 | 7/2002 | Doyle et al. |
| 2002/0097144 | A1 * | 7/2002 | Collins et al. ............... 340/333 |
| 2002/0132664 | A1 | 9/2002 | Miller et al. |
| 2002/0141621 | A1 | 10/2002 | Lane |
| 2002/0145507 | A1 | 10/2002 | Foster |
| 2002/0163421 | A1 * | 11/2002 | Wang et al. ................ 340/5.83 |
| 2003/0046554 | A1 | 3/2003 | Leydier et al. |

FOREIGN PATENT DOCUMENTS

| | | |
|---|---|---|
| EP | 1 094 682 A1 | 10/1999 |
| EP | 1061482 A1 | 12/2000 |
| EP | 1223560 A2 | 7/2002 |
| WO | WO 98/12670 | 3/1998 |
| WO | WO 99/56429 | 11/1999 |
| WO | WO 01/35334 A1 | 5/2001 |
| WO | WO 01/59686 A1 | 8/2001 |
| WO | WO 01/86599 A2 | 11/2001 |
| WO | WO 01/88859 A2 | 11/2001 |

OTHER PUBLICATIONS

Biometric Associates, Inc., web page http://www.biometricassociates.com/products2.html, 2001.

Biometric Associates, Inc., web page http://www.biometricassociates.com/products.html, 2001.

Biometric Associates, Inc., web page http://www.biometricassociates.com/html, 2001.

Menezes, A.J., "Handbook of Applied Cryptography", CRC Press, Boca Raton, Florida, cover sheet and pp. 321-322, 330-331 and 386-390, 1997.

EPO Search Report issued by the European Patent Office on Jul. 28, 2005 in EP Application No. 03745633.2-2415, 3 pages.

* cited by examiner

APPARATUS AND METHOD FOR EFFECTING SECURE PHYSICAL AND COMMERCIAL TRANSACTIONS IN A CONTACTLESS MANNER USING BIOMETRIC IDENTITY VALIDATION

CROSS-REFERENCE

This application claims priority from U.S. Provisional Patent Application Ser. No. 60/368,363, filed on Mar. 28, 2002.

BACKGROUND

The present disclosure relates generally to authentication and, more specifically, to an apparatus and method for effecting secure physical and commercial transactions in a contactless manner using biometric identity validation.

Identity validation, transaction approval, and similar issues are becoming increasingly important. The widespread use of credit cards for remote transactions presents the need to ensure that the person making a purchase is authorized to do so. In addition, security concerns increase the need for convenient and reliable identity validation for access to secure areas of businesses, government offices, and similar areas.

Although attempts have been made to solve meet these needs, a satisfactory solution has not yet been achieved. Many proposed solutions are unwieldy, fail to provide identity validation, require connections to external devices, or have similar issues.

Accordingly, what is needed is an apparatus and method for effecting secure physical and commercial transactions in a contactless manner using biometric identity validation. It is desirable that the apparatus be relatively self-contained and that it interact with other devices without requiring physical contact. It is also desirable that the apparatus be easy to transport and use, and that it accommodate a variety of different applications.

SUMMARY

Provided is an apparatus and method for effecting secure transactions in a contactless manner. In one embodiment, the apparatus comprises

DETAILED DESCRIPTION

Figure 1:
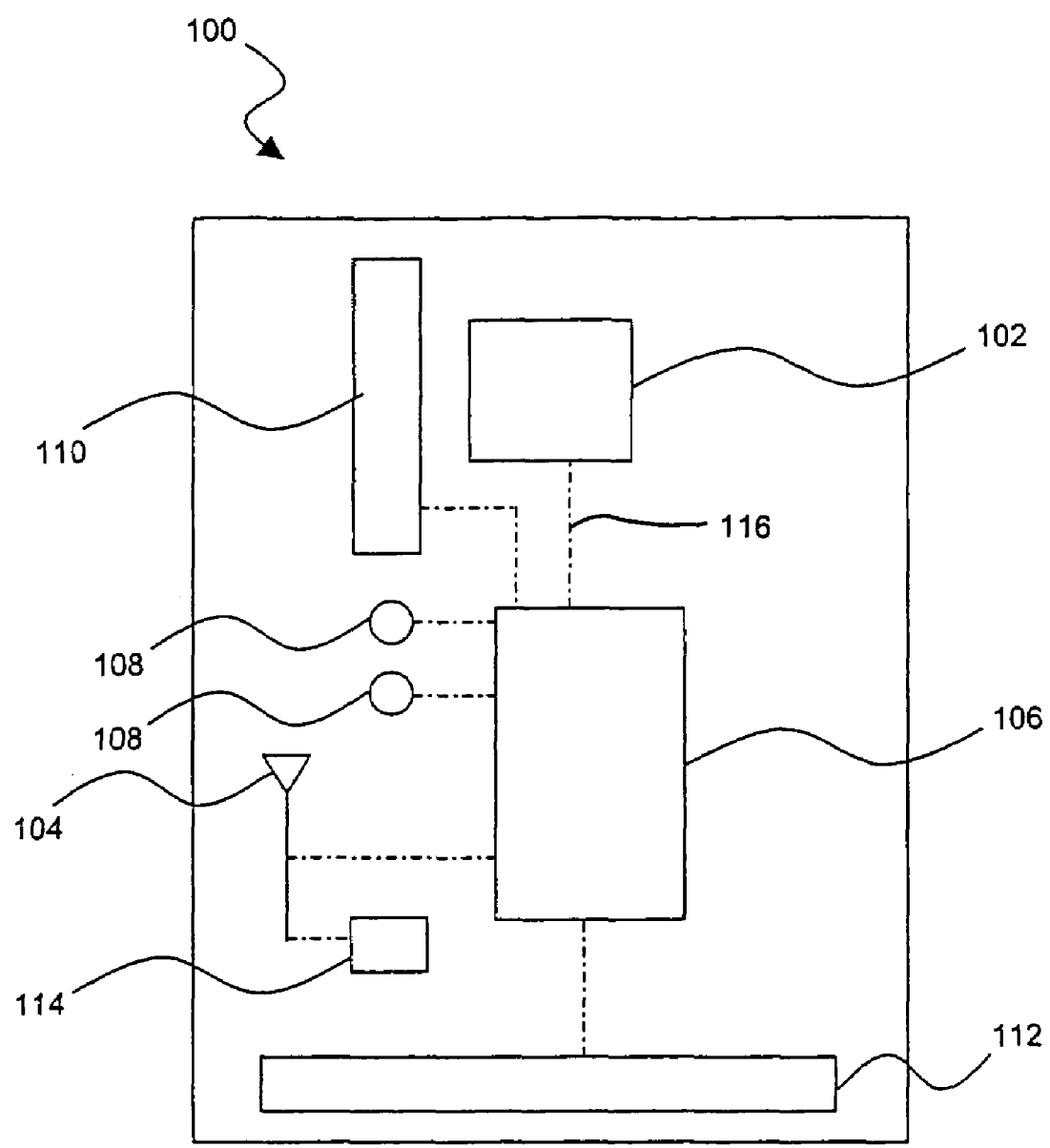
FIG. 1 is a diagram illustrating one embodiment of an exemplary device for effecting secure physical and commercial transactions in a contactless manner using biometrics identity validation.

The present disclosure relates generally to authentication and, more specifically, to an apparatus and method for effecting secure physical and commercial transactions in a contactless manner using biometric identity validation. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of an intelligent device 100 is depicted. As will be described later in greater detail, the device 100 is comprised of multiple components, including a biometric sensor 102, a radio frequency ("RF") antenna 104, a controller 106, control buttons 108, a dynamic information display 110, a magnetic information media component 112, and a RF power conversion and power management unit 114. A plurality of inter-component communication paths 116 provide connections between various components of the device 100.

The RF antenna 104 may perform multiple functions. For example, it may capture RF energy from a RF field emanated by a RF power source and may also support two-way communication with an associated reader/writer device (not shown). The antenna 104 may be a single antenna capable of performing both functions or may comprise multiple antennae, with one antenna for capturing RF energy from the RF field and another antenna for supporting the two-way communication with the reader/writer device. The communications envisioned include, for example, authenticated identification of a person operating the device 100, various purchases and financial transactions, air ticket booking and airport security check points, and other interactions between the device 100 and the reader/writer device. These communications may be secured using mechanisms such as data encryption. It is understood that other communications components, such as audio or optical components, may replace or supplement the antenna 104. In addition, the antenna 104 may be operable to function with wavelengths other than RF.

The biometric sensor 102 is used for sensing a physical attribute of a user of the device 100 and generating an analog of this physical attribute. The analog may then be made available to the controller 106. More specifically, the biometric sensor 102 is designed to sense some physical attribute of a person and extract a distinctive analog of that person. To be useful for establishing positive identification, the analog may need to be individualized sufficiently so as to be unique to every person. In addition, a trusted copy—a template—of the analog should be captured. Analogs later sensed by the biometric sensor 102 may then be compared against the template analog. Various physical attributes may be used for identification purposes, such as fingerprints, voice prints, and retinal prints.

The controller 106 interacts with the biometric sensor 102 and other components of the device 100 to perform various functions. For example, the controller 106 may capture the analog of the physical attribute for long term storage as a trusted template analog of an authorized user, as well as for immediate comparison to a stored trusted template analog during an authentication procedure. The controller 106 may also determine whether the comparison indicates a match between the template analog and the analog captured by the biometric sensor 102. In addition, the controller 106 may control the dynamic information display 110, respond to input from the control buttons 110, and control the magnetic information media component 112. Furthermore, the controller 106 may support two-way communications with an associated reader/writer device (FIG. 2) via the RF antenna 104. The controller may be a single controller/processor or may comprise multiple controllers/processors.

The dynamic information display 110 may be used to display information to a user, as well as to enable a process with which the user may interact using the control buttons 110. The magnetic information media component 112 may be manipulated so that it provides information via a magnetic field. The RF power control unit 114 may convert RF radio energy to electrical energy, and may control storage and distribution of this electrical energy to the other components in the device 100. It is understood that the device 100 may also have a battery and/or other power means to use as a backup or alternative power source for the RF power control unit 114.

Figure 2:
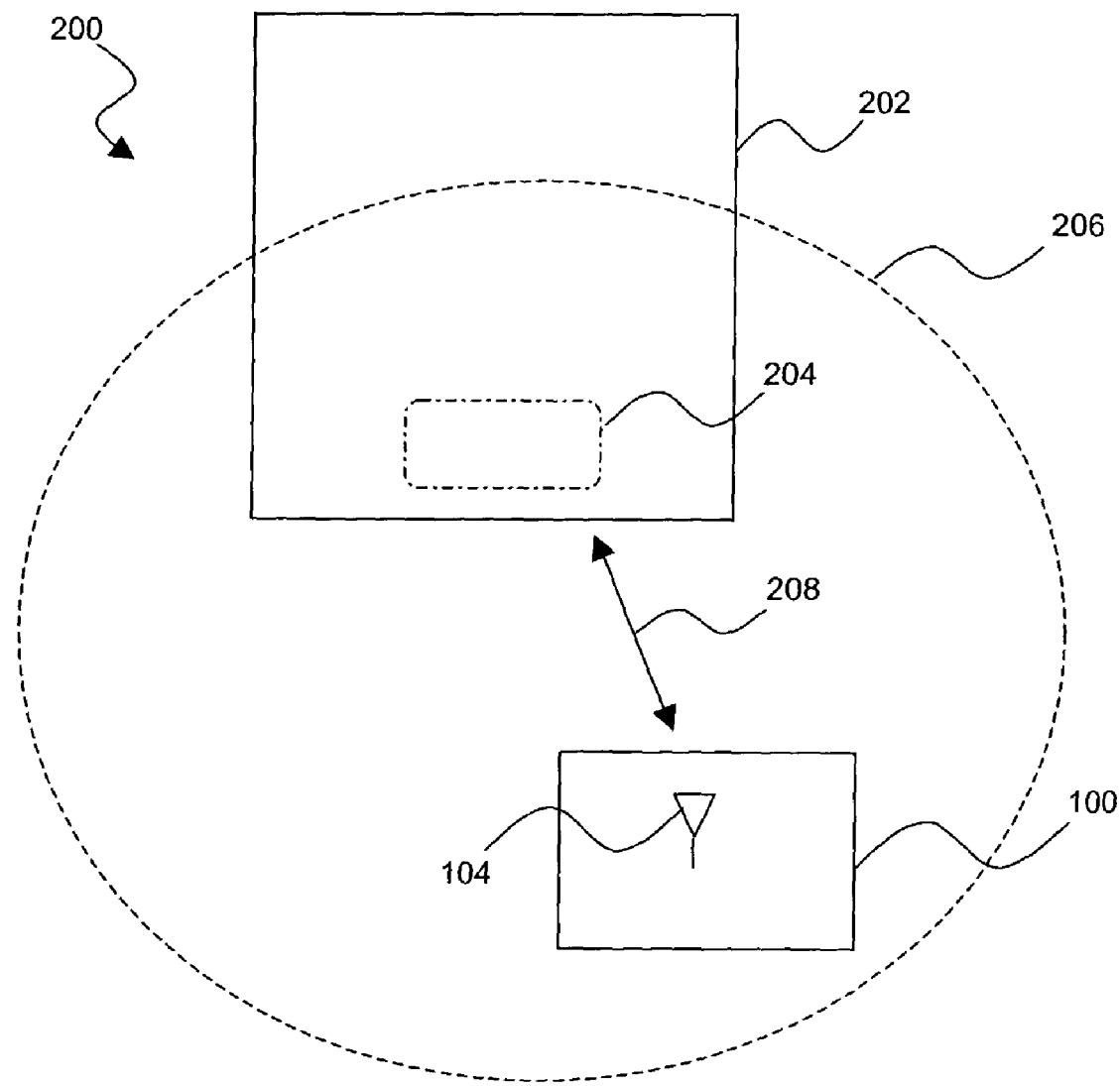
FIG. 2 illustrated an exemplary environment in which the device of FIG. 1 may operate.

Referring now to FIG. 2, the device 100 is illustrated in an exemplary environment 200 that enables contactless interaction with a reader/writer device 202. To achieve this contactless interaction, the device 100 is shown with the antenna 104, as described in reference to FIG. 1. The device 202 uses one or more antennae 204 to communicate with the device 100, as well as emanate a RF power field 206 with the purpose of supplying power to compatible devices, such as the device 100. In operation, a two-way communication link 208 may be established between the reader/writer device 202 and the device 100.

It is understood that many different reader/writer configurations may be used. For example, the reader/writer device 202 may be in communication with other devices or with a network. Furthermore, the reader/writer device 202 may include the RF power source, or they may be separate devices. For purposes of clarity, the reader/writer device 202 of the present example includes the RF power source.

Figure 3:
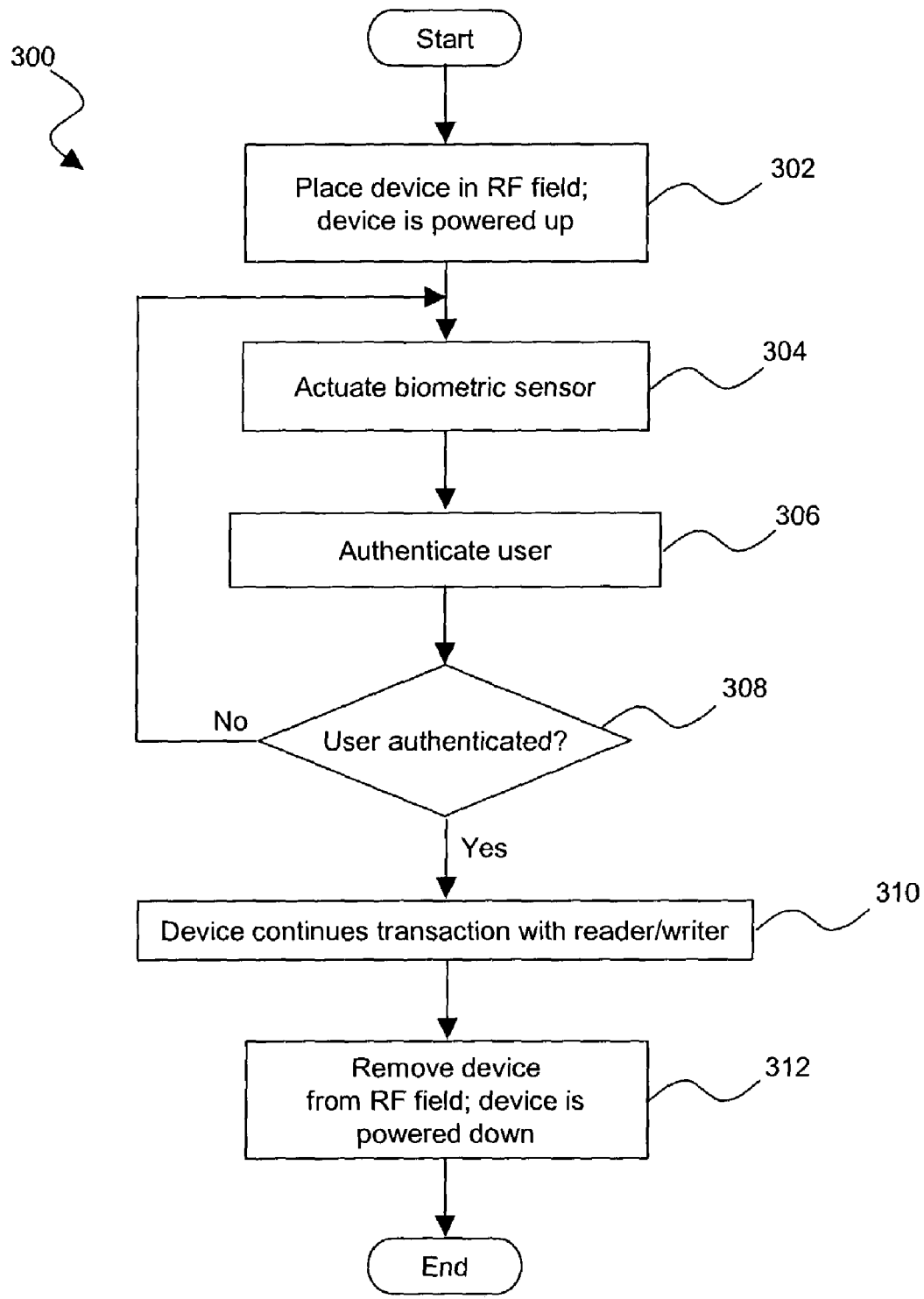
FIG. 3 is a flow chart of an exemplary method for using the device of FIG. 1 in the environment of FIG. 2.

Referring now to FIG. 3 and with continued reference to FIGS. 1 and 2, the device 100 may be operated in the environment 200 using a method 300 as follows. In step 302, the device 100 is placed into the RF field 206 emanated by the reader/writer device 202. When placed into the RF field, the device 100 captures power from the RF field 206, which powers up the device 100's electronics. In step 304, the biometric sensor 102 is actuated by a user. The method of actuation may depend on the type of biometric sensor (e.g., a fingerprint for a fingerprint sensor, speaking for a voice sensor, etc.). In step 306, an authentication process is performed by the device 100. As in the previous step, the authentication process may depend on the type of biometric sensor. For example, the detected fingerprint or voice may be compared to a template in the memory of the device 100. In step 308, a determination is made as to whether the user is authenticated. If the authentication process fails to validate the user, the method 300 may return to step 304. If the user is validated by the authentication process, the method continues to step 310, where the device 100 continues the desired transaction with the reader/writer device 202. Once this occurs, the device 100 may be removed from the RF field 206 in step 312, which powers down the device 100.

Figure 4:
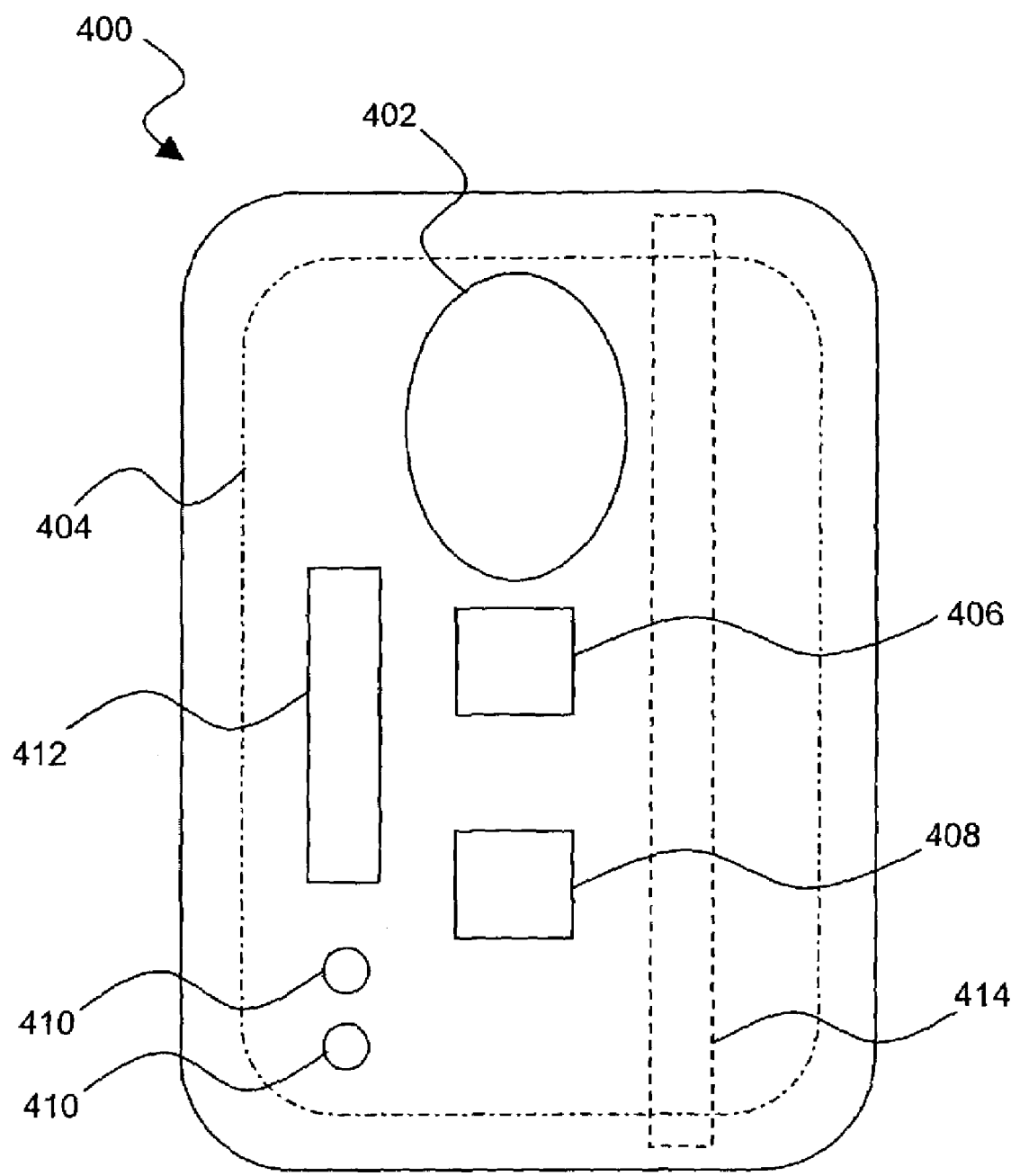
FIG. 4 is a diagram illustrating another embodiment of an exemplary device for effecting secure physical and commercial transactions in a contactless manner using biometrics identity validation.

Referring now to FIG. 4, in another embodiment, a device 400 illustrates an implementation of the present disclosure using a form factor similar to that of a credit card. The credit card form factor of the device 400 includes a plurality of components, such as a fingerprint sensor 402, a RF antenna 404, a first controller 406, a second controller 408, function selector buttons 410, an electro-luminescent display 412, and a magnetic strip 414. In the present example, the first controller 406 is an application specific integrated circuit ("ASIC") chip and the second controller 408 is a smart card chip, although it is understood that the functionality of both controllers may be provided by a single controller.

The ASIC 406 is a custom integrated circuit chip developed for use in the device 400. The ASIC 406 includes Random Access Memory ("RAM") which may be used for temporarily storing a current fingerprint analog detected by the fingerprint sensor 402 and for temporarily storing intermediate results of processing calculations (e.g., fingerprint comparisons, etc.). The ASIC 406 may also include non-volatile memory (e.g., Flash memory or EEPROM) to store and retrieve one or more fingerprint template analogs that are used for comparison against the current fingerprint analog.

Circuitry contained within the ASIC 406 provides an interface between the ASIC 406 and the fingerprint sensor 402. In the present example, the ASIC 406 contains a microprocessor core with dedicated program and temporary memory, enabling the ASIC 406 to use an array of processing elements for executing instructions stored within the ASIC 406 in parallel. The instructions enable the ASIC 406 to perform a comparison between the current fingerprint analog and a template fingerprint analog. Other instructions included within the ASIC 406 may provide support for an authorization signal to be sent to the smart card chip 408 after an authentication process has been completed. In addition, the ASIC 406 may be used to drive the electro-luminescent display 412, read the function control buttons 410, and drive the programmable magnetic strip 414.

The smart card chip 408 may support various application programs. These applications may include, for example, storage/retrieval of personal demographics information, storage/retrieval of a digitized picture of the cardholder, an "electronic purse" functionality, financial transactions, purchases, etc. In addition, the smart card chip 408 may support two-way communication data transfers and may perform various encryption functions to support secure communications. In the present example, the communications and encryption are based on known standards, but proprietary protocols may be used if desired. It is envisioned that the smart card chip 408 may support standard smart card interactions such as identification validation, credit card transactions, and others.

The fingerprint sensor 402 is designed to detect fingerprint information and provide the detected information to other components of the device 400. In the present example, the fingerprint sensor 402 comprises a polymer thick film ("PTF") construction, which provides the fingerprint sensor 402 with the flexibility and ruggedness needed for implementation on the device 400. As is described in greater detail below in FIGS. 5 and 6*a*, the fingerprint sensor 402 comprises a matrix of points that are operable to detect high and low points corresponding to ridges and valleys of a fingerprint. The points are captured and used by the ASIC 406 to determine whether the detected fingerprint analog matches a fingerprint template analog that is stored in memory.

Figure 5:
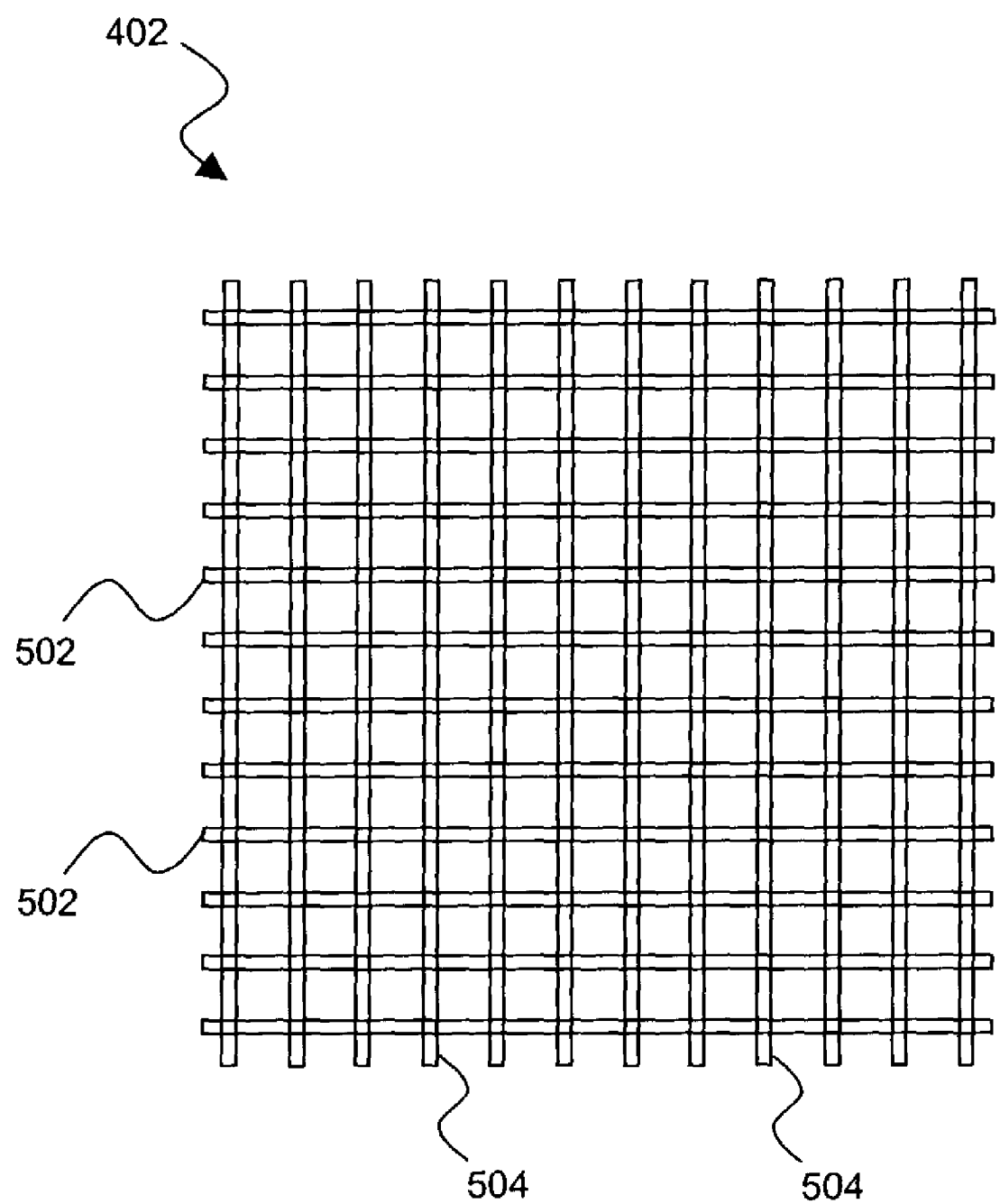
FIG. 5 is an illustration of one embodiment of a biometric sensor that may be used in the device of FIG. 4.

Referring now to FIG. 5, in one embodiment, the PTF sensor 402 comprises a rectangular arrangement of row electrodes 502 and column electrodes 504. It is noted that more or fewer columns and rows may be included in the PTF sensor 402, depending on such factors as the desired resolution of the PTF sensor 402 (e.g., the number of data points desired). Electrical connections from the row and column electrodes 502, 504 may route to the ASIC 306.

In operation, a fingerprint analog detected by the PTF sensor 402 may be captured by the ASIC 406 as a sequence of numerical values. For purposes of illustration, the row and column electrodes 502, 504 may be viewed as a two dimensional matrix of pixels, with numerical values representing intersections between the row and column electrodes. The numerical values may be associated with gray scale values, and an analog representing a fingerprint may be generated from the matrix of gray scale values. It is understood that there is no need to transform the captured analog into a visible image since the matching between the stored template fingerprint analog and the candidate fingerprint analog need not rely on a visual process. However, it is convenient to conceptualize the numerical values as an image for purposes of evaluating the sensor resolution used to support fingerprint authentication. It is generally accepted that a graphical resolution of from 100 dots per inch ("dpi") to 500 dpi is sufficient for fingerprint authentication. In the present example, the PTF sensor 402 comprises 200 row electrodes and 200 column electrodes arranged in a ½" by ½" matrix, which corresponds to a graphical resolution of 400 dpi.

Figure 6A:
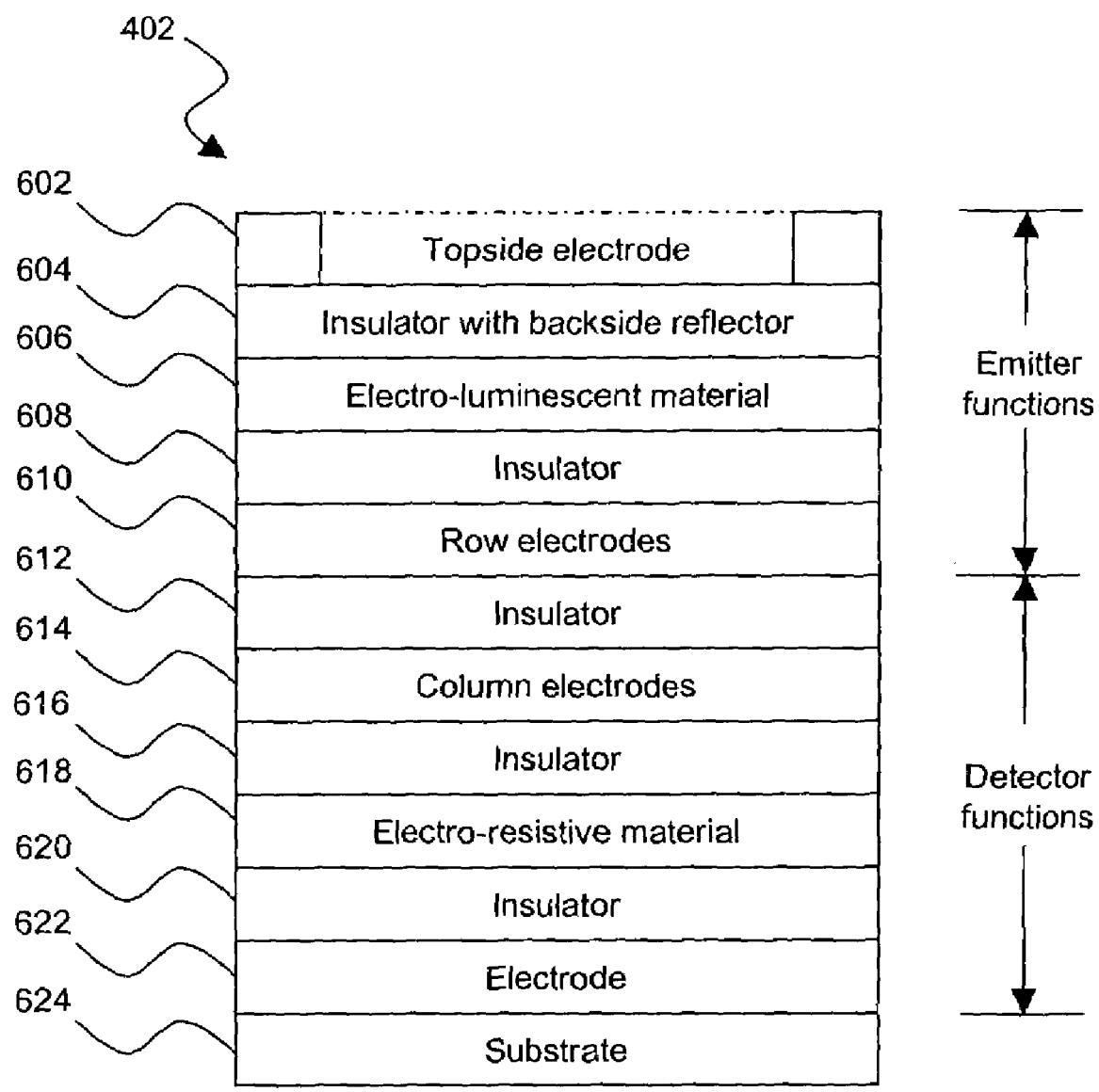
FIG. 6a illustrates a plurality of layers that form one embodiment of the biometric sensor of FIG. 5.

Referring now to FIG. 6*a*, a schematic depiction of functional layers of one embodiment of the PTF sensor 402 of FIG. 4 is shown. The PTF sensor 402 is comprised of functional layers including an annularly shaped topside electrode 602; an insulator with backside reflector 604; an electro-luminescent layer 606; insulator layers 608, 612, 616, and 620; row electrodes 610; column electrodes 614; an electro-resistive layer 618; an electrode 622; and a substrate layer 624. The substrate layer 624 may be a portion of the substrate for the entire device 400.

In operation, when a user of the device 400 places a finger or thumb (henceforth only finger will be specified, although it is understood that both fingers and thumb are intended) on the surface of the PTF sensor 402, the finger contacts the topside electrode 602 and becomes electrically grounded to the topside electrode 602. When a voltage is applied to row electrodes 610, an electric field is generated between the row electrodes 610 and the topside electrode 602. The strength of the generated field varies depending on how close the finger is to the topside electrode 602. For example, fingerprint ridges may be relatively close to the topside electrode 602 of the PTF sensor 402, varying the generated field in a detectable manner. Fingerprint valleys may be more distant from the PTF sensor 402 than the fingerprint ridges, which may vary the generated field in a detectable manner that may be differentiated from the variations caused by the fingerprint ridges.

The electro-luminescent layer 606 may emit more or less light as the electric field that impinges upon it varies, thereby generating an analog of the fingerprint incident upon the PTF sensor 402. The reflector component of the insulator with backside reflector layer 604 serves to reflect the omni directional light emitted by the electro-luminescent layer 606 and thus intensify the fingerprint analog. The PTF sensor 402 may be operated by applying a bias voltage to only one row electrode at a time, successively biasing and unbiasing one row after another. This has the effect of causing the electro-luminescent layer 606 to generate an analog of an elongated thin strip of the fingerprint. By sensing each of these analogs and combining them upon completion of row sequencing, a complete analog may be collected.

It is a property of the electro-resistive layer 618 that when it is placed in an electrical field its resistance varies with the intensity of light incident upon it. The light emitted by the electro-luminescent layer 606, which is an analog of the fingerprint, passes through the intervening layers 608, 610, 612, 614, and 616 to impinge upon the electro-resistive layer 618. The electro-resistive layer 618 is placed in an electric field by placing a DC voltage bias on the electrode 622 relative to the column electrodes 614, causing the electro-resistive layer to exhibit varying resistance depending upon the intensity of light incident upon it and thereby forming an analog of the fingerprint. A voltage is applied to the column electrodes 614, and the impedance between the column electrodes 614 and the electrode 622 can be measured. This measured impedance is directly related to the varying resistance of the electro-resistive layer 618 and hence an analog of the fingerprint. So by activating each row electrode in succession, as described above, an analog of the fingerprint can be captured and stored.

The ASIC 306 may control the sequential activation of the row electrodes 610, the reading back of the varying resistance from the column electrodes 614, and other functions of the PTF sensor 402. It is understood that other approaches may be used, such as reading one column at a time for each row or reading multiple row/columns at once. Furthermore, while the preceding description focuses on the use of the PTF sensor 402 as a fingerprint sensor, the principle of operation of the PTF sensor 402 is general and not limited to capturing fingerprint analogs.

Figure 6B:
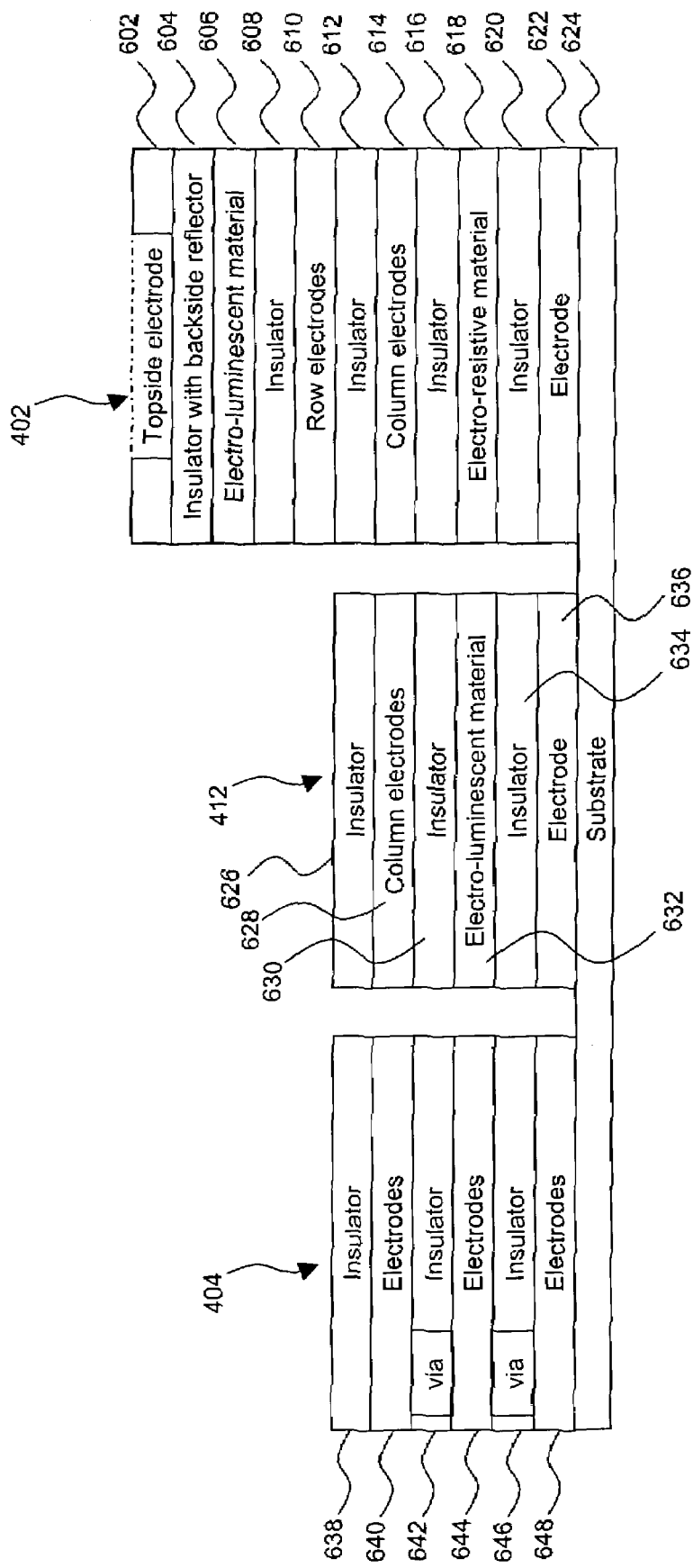
FIG. 6b illustrates a plurality of layers that form a portion of one embodiment of the device of FIG. 4.

Referring now to FIG. 6*b*, one embodiment of a portion of the device 400 illustrates the biometric sensor 402, display 412, and RF antenna 404 formed on the substrate 624. The biometric sensor comprises layers 602-622 as described with respect to FIG. 6*a*, the display 412 comprises layer 626-636, and the RF antenna comprises layers 638-648. As is illustrated in FIG. 6*b*, each of the components 402, 412, 404 share a number of layers (e.g., 622, 636, and 648). This sharing simplifies the design of the device 400 and may also reduce manufacturing costs.

Referring again to FIG. 4, the RF antenna 404, which may comprise one or more antennae, may capture RF energy from a RF field emanated by a RF power source and may also support two-way communication with an associated reader/writer device (not shown). The RF energy which is captured is converted to electrical energy and accumulated within the device 400. In some embodiments of the device 400, a rechargeable battery may power the electronic components when no RF energy field is present. Such a battery may be charged via an RF energy field or alternative charging means.

The electro-luminescent display 412 provides the capability to display information to a user of the device 400. For example, the information may include a credit card number to support "card not present" transactions, a residual balance of an "electronic purse," air travel flight and seat assignment information, and similar information. Furthermore, interaction with the display 412 may be accomplished via the function control buttons 410. For example, the buttons 410 may be used to select a credit card number (if the device 400 stores multiple numbers) viewed via the display 412 or to enter a personal identification number. The pliability of the electro-luminescent display 412 aids its use in the card-like form factor of the device 400. While two function control buttons 410 are illustrated, it is understood that other numbers and configurations of function control buttons may be used.

A dynamic magnetic strip 414 is provided to provide compatibility with existing reader devices. The dynamic magnetic strip 414 may be used in either fixed or dynamic mode. In dynamic mode, magnetically stored information—such as a credit card number—may be changed under control of the ASIC 406.

Figure 7:
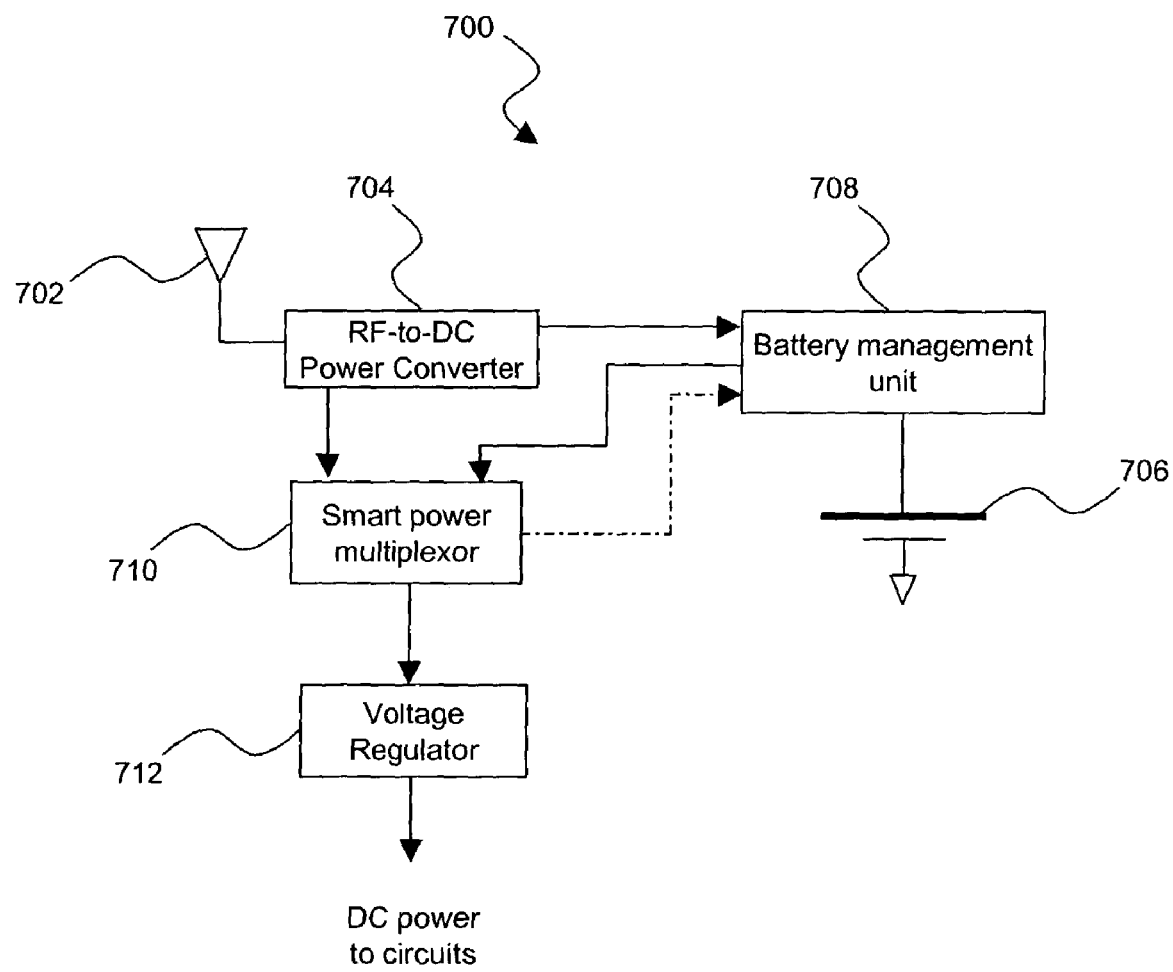
FIG. 7 is a diagram of an exemplary power circuit that may be used in the device of FIG. 4.

Referring now to FIG. 7, an illustrative power circuit 700, such as may be used in the device 400 of FIG. 4, is depicted. When appropriate RF energy is incident upon the device 400, the RF energy couples into a RF antenna 702. From the antenna 702, the energy enters a RF-to-DC power converter 704, which includes a full-wave rectifier to convert the AC RF field into a DC-like circuit. Capacitance may be provided to buffer the AC peak variations into a DC-like source. The intermediate power generated by this process may be used for a variety of purposes, such as charging a battery 706 if the battery 706 is below its full capacity and feeding power to the device 400. The battery 706 may be charged through a battery management unit 708. A smart power multiplexer 710 may be used to determine whether to draw power from the battery management unit 708, directly from the RF-to-DC power converter 704, or from both.

A voltage regulator 712 creates a stable DC voltage level to power the device 400. When no RF energy is coupled into the RF antenna 702, the RF-to-DC converter 704 may not function and power may be drawn from the battery management unit 708 by the smart power multiplexer 710. As before, the voltage regulator 412 creates a stable DC voltage level to power the device 400. It is understood that, in other embodiments, the power circuit 700 may not employ a battery or rechargeable battery, and may rely solely on power captured from the RF field.

Figure 8:
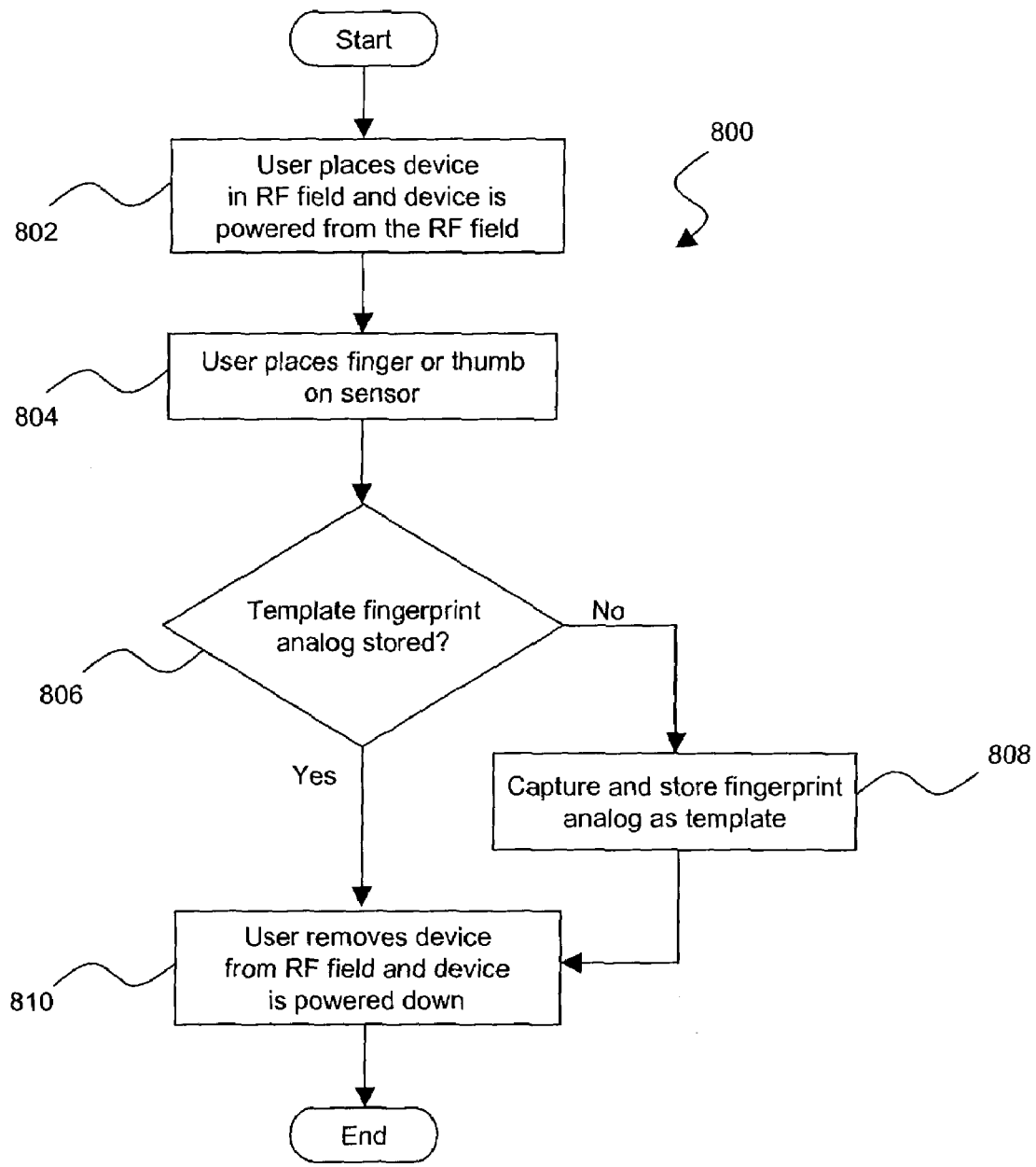
FIG. 8 is a flow chart of an exemplary method for storing a template fingerprint analog in the device of FIG. 4.

Referring now to FIG. 8, an exemplary template storage method 800 illustrates one embodiment for capturing and storing a template of a fingerprint analog for the device 400 of FIG. 4. In step 802, a user places the device 400 in a RF field emanated by a reader/writer device. As described previously, the device 400 captures power from the RF field. In step 804, the user places his thumb or finger on the fingerprint sensor 402 and, in step 806, the device 400 determines whether a template fingerprint analog is already stored. If it is determined that no template fingerprint analog is stored, the method 800 continues to step 808. In step 808, the user's incident fingerprint is sensed by the fingerprint sensor 402, a fingerprint analog is generated by the fingerprint sensor 402, and the ASIC 406 stores the fingerprint analog as a template fingerprint analog. If a fingerprint template analog is already stored, the method 800 continues to step 810, where the device 400 is removed from the RF field. It is understood that other events may occur before step 810 if a fingerprint template analog is already stored, such are illustrated in FIG. 9.

Although not shown in the present example, multiple template fingerprint analogs may be stored in the device 400. The template fingerprint analogs may represent multiple fingerprints of a single person or may represent the fingerprints of different people. This may be accomplished, for example, by implementing a method for allowing the device 400's owner to securely control initialization of multiple template fingerprint analogs and to selectively enable which template fingerprint analog will be used to authenticate identity and authorize transactions. Alternatively, if the device 400 is to be used in environments requiring higher security, the user of the device 400 may need to appear in person and validate his or her identify using traditional methods (e.g., a driver's license, birth certificate, etc.). After validation, the user's template fingerprint analog may be placed into the device 300 as described above or through other means (e.g., a scanner that transfers the template fingerprint analog into the device 300).

Figure 9:
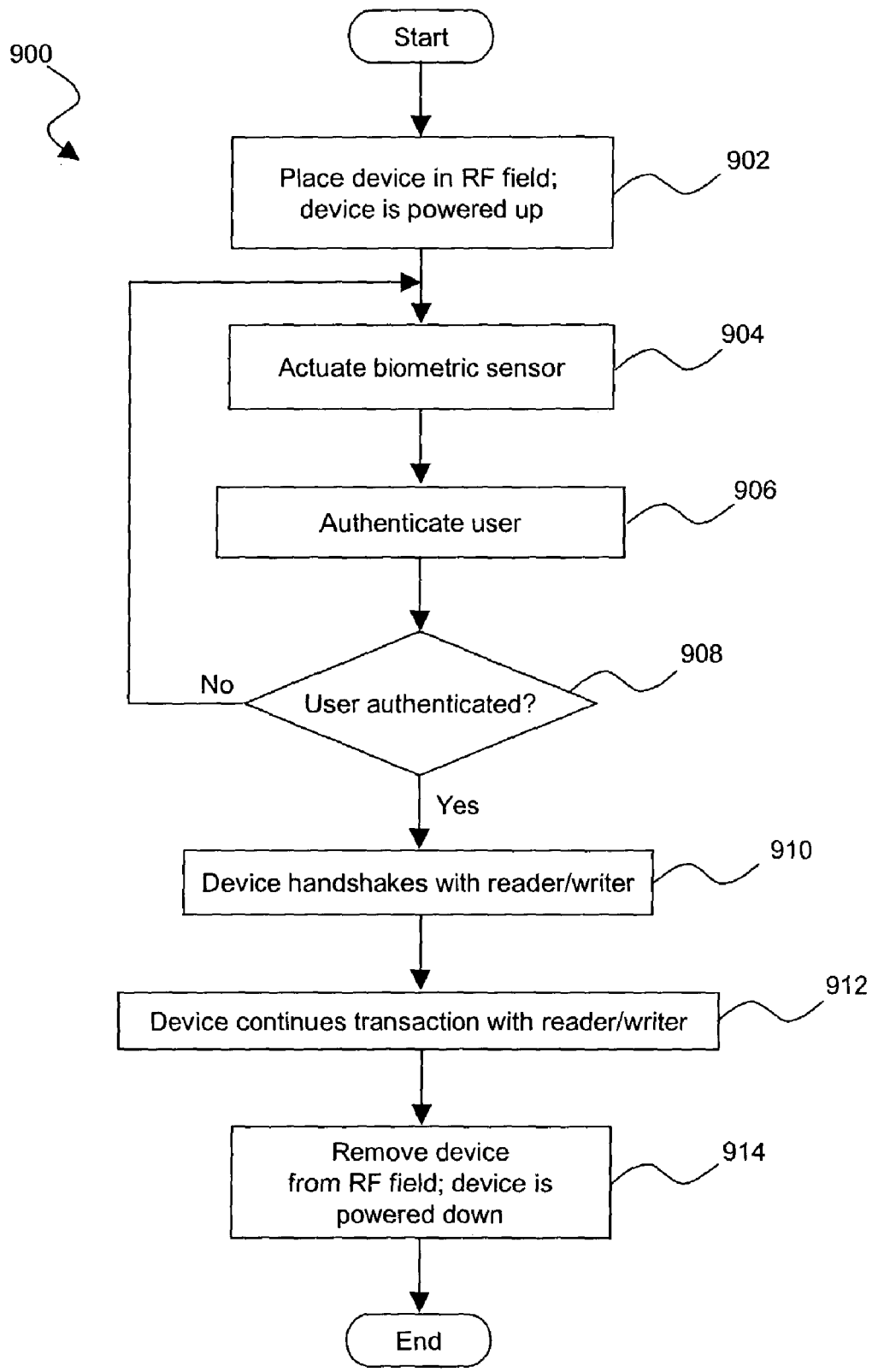
FIG. 9 is a flow chart of an exemplary method for using the device of FIG. 4.

Referring now to FIG. 9, in another embodiment, a method 900 illustrates one method of operation for the device 400. In step 902, as has been described previously, the device 400 is placed into an RF field emanated by a reader/writer device. When placed into the RF field, the device 400 captures power, energizing its electronics. In step 904, a user places one of his fingers onto the fingerprint sensor 402. As described above, the fingerprint sensor 402 captures an analog of the fingerprint and passes the analog to the ASIC 406.

In step 906, an authentication process is performed by comparing the captured fingerprint analog to one or more template fingerprint analogs stored in memory. In step 908, a determination is made as to whether the user is authenticated (e.g., whether the captured fingerprint analog matches a stored template fingerprint analog). If the authentication process fails to validate the user, the method 900 may return to step 904 as shown or may end, requiring the user to remove the device 400 from the RF field and begin again with step 902. If the user is validated by the authentication process, the method continues to step 910, where the device 400 conducts a communications handshake process with the reader/writer device via a contactless two-way communication link. In step 912, the device 400 continues the desired transaction with the reader/writer device. Once this occurs, the device 400 may be removed from the RF field, which powers down the device 400.

Figure 10:
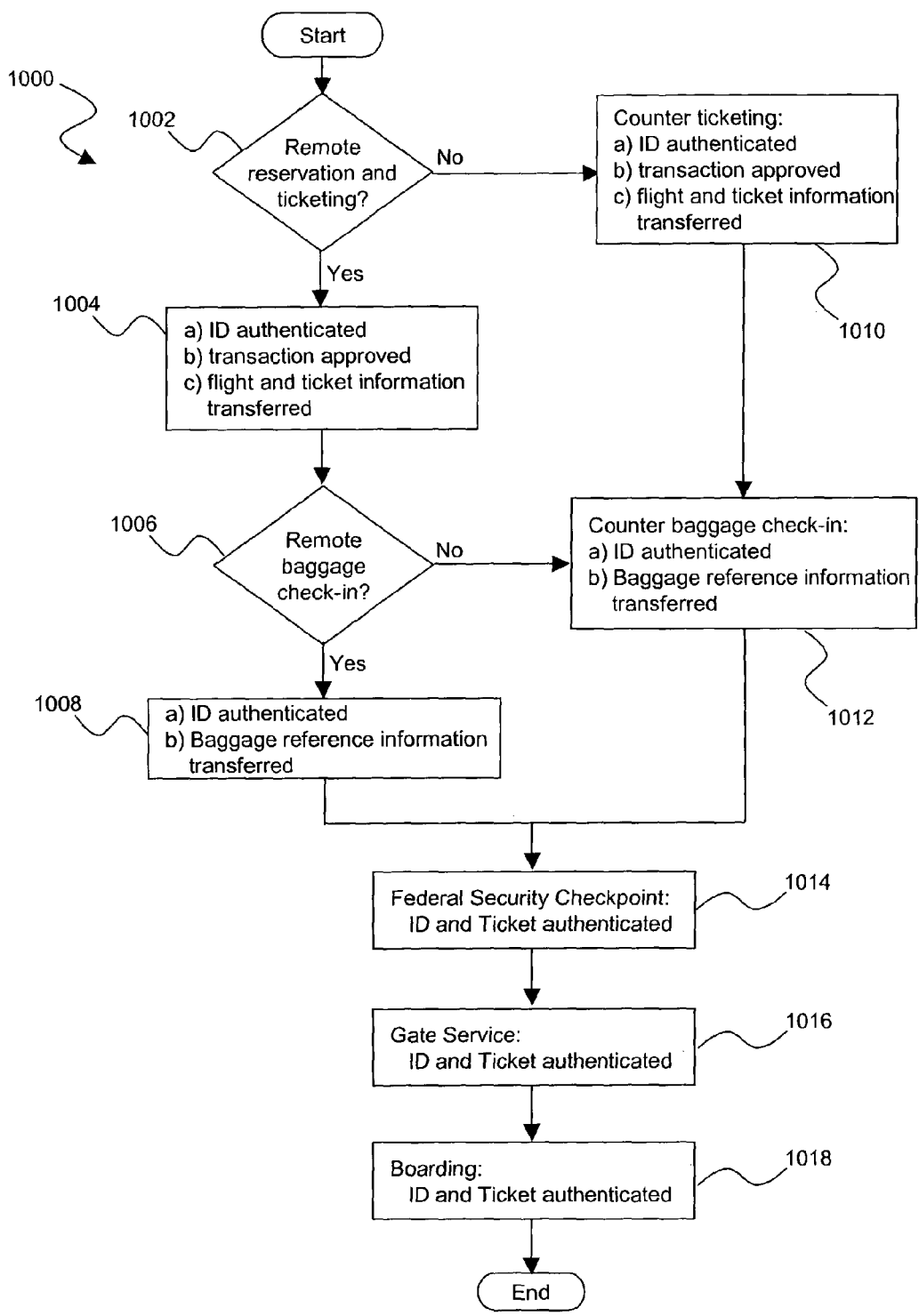
FIG. 10 is a flow chart of an exemplary method for using the device of FIG. 1 in an air transportation environment.

Referring now to FIG. 10, in another embodiment, a method 1000 illustrates using the present disclosure in an air transportation environment. A traveler desiring to make a remote reservation presents a device (such as the device 100 of FIG. 1) to a reader/writer device. In the present example, the reader/writer device is attached to a personal computer ("PC") via a wired or wireless connection. The PC may enable the traveler to access an application, such as a web based flight reservation application.

In step 1002, a determination is made as to whether the traveler has selected a remote reservation and ticketing process. If the traveler has selected such a process, the method 1000 continues to step 1004, where the device 100 is used in conjunction with PC and the reader/writer to verify the traveler's identification and approve the transaction and associated payments. In addition, flight information may be transferred from the reader/writer device into the device 100.

The method 1000 then continues to step 1006, where a determination is made as to whether the traveler has selected to remotely check-in baggage. If the traveler has not selected to remotely check-in baggage, the method 1000 continues to step 1012. If the traveler has selected to remotely check-in baggage, the method 1000 continues to step 1008, where the device 100 is used in conjunction with PC and the reader/writer to verify the traveler's identification. In addition, flight and ticket information may be read from the device 100 to further automate the baggage check-in process. After the traveler has entered any desired information (e.g., number of bags, etc.), baggage reference information may be transferred into the traveler's device 100.

Returning to step 1002, if it is determined that the traveler has not selected a remote reservation and ticketing process, the method 1000 continues to step 1010, where the traveler may use the device 100 with a reader/writer device at a counter or self-service kiosk in a manner similar to the process of the remote check-in of step 1004. More specifically, the traveler may use the device 100 to verify the traveler's identification and approve a purchase transaction, as well as any associated payments. In addition, flight information may be transferred from the reader/writer device into the device 100.

Continuing to step 1012, the traveler may use the device 100 with the reader/writer device at the counter or self-service kiosk in a manner similar to the process of the remote baggage check-in of step 1008. More specifically, the traveler may use the device 100 to verify the traveler's identification, provide flight and ticket information, and store baggage reference information that is transferred from the reader/writer device.

After the ticketing and baggage check-in, the method 1000 continues to steps 1014, 1016, and 1018, where the traveler may present the device 100 to other reader/writer devices for identification and ticket authentication. For example, this may occur at security checkpoints, gates, and/or at boarding. It is understood that some of the reader/writer devices may be in communication with airline and/or government databases.

Figure 11:
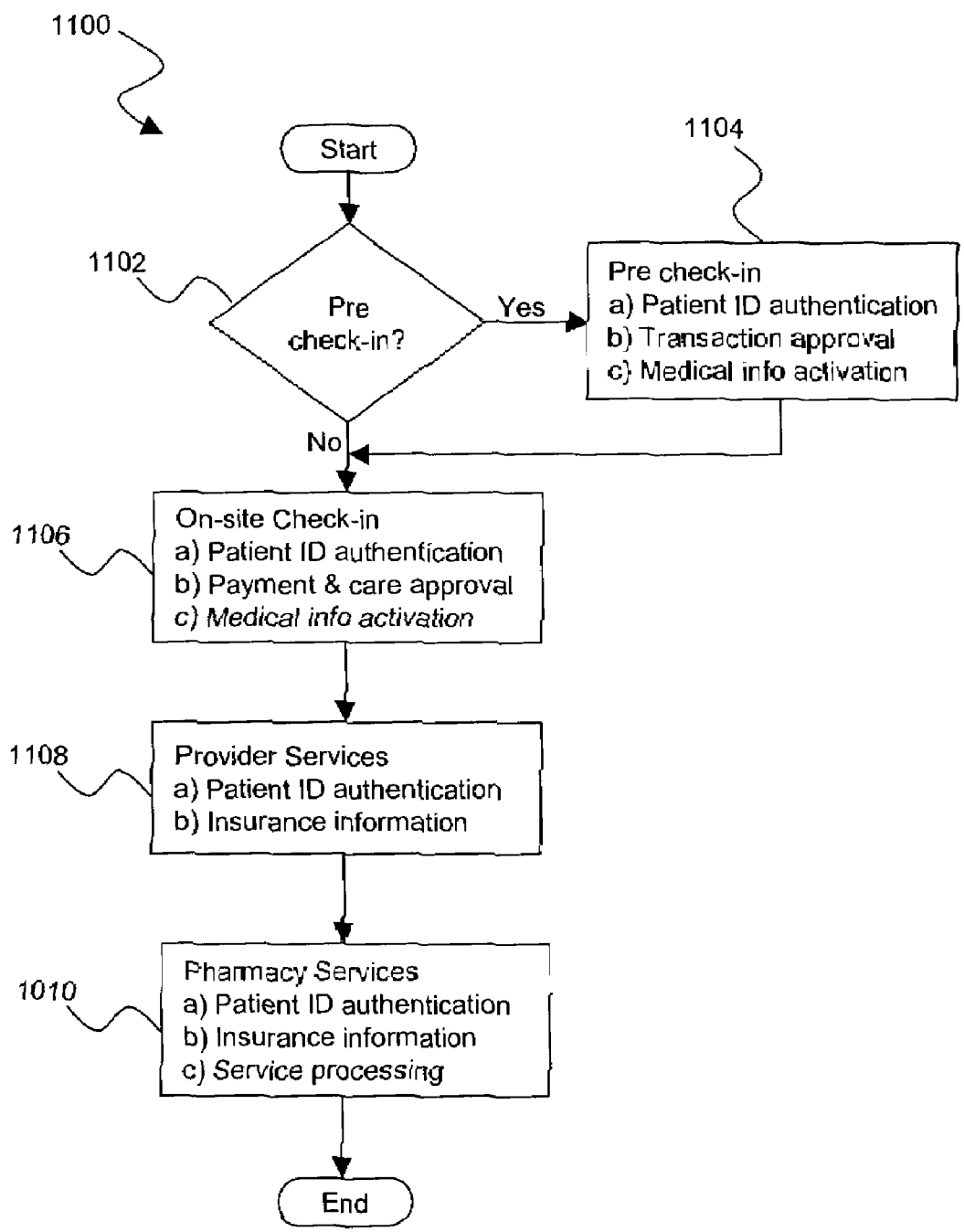
FIG. 11 is a flow chart of an exemplary method for using the device of FIG. 1 in a healthcare environment.

Referring now to FIG. 11, in another embodiment, a method 1100 illustrates using the present disclosure in a health care environment. In step 1102, a determination is made as to whether a patient desires to perform a pre check-in process before arriving at a healthcare facility. If it is determined that the patient does desire to perform a pre check-in process, the method 1100 continues to step 1104, where the patient may present a device (such as the device 100 of FIG. 1) to a reader/writer device. In the present example, the reader/writer device is attached to a personal computer ("PC") via a wired or wireless connection. The PC may enable the patient to access an application, such as a web based healthcare application. Upon presentation of the device in step 1104, the patient may be identified, payment and care instructions may be approved, and medical information (e.g., records, prescriptions, etc.) may be activated. The device 100 may also be used to provide the patient with medical alerts.

In step 1106, if the patient has not performed the pre check-in process of step 1104, the patient may use the device 100 to perform similar functions at the healthcare facility. The method then continues to step 1108, where the device may be used to access provider services. For example, the device 100 may be used to interact with a reader/writer device at a desk or workstation in the healthcare facility (e.g., an examination room). This interaction may authenticate the patient's identification, provide access to pertinent medical records, verify that the records are updated, and store one or more prescriptions.

Continuing to step 1110, the patient may present the device 100 to a reader/writer device at a pharmacy. The device 100 may be used to authenticate the patient's identification for a prescription and provide the prescription to the pharmacy. Furthermore, the device 100 may provide insurance/payment information and enable the patient to approve the transaction.

Figure 12:
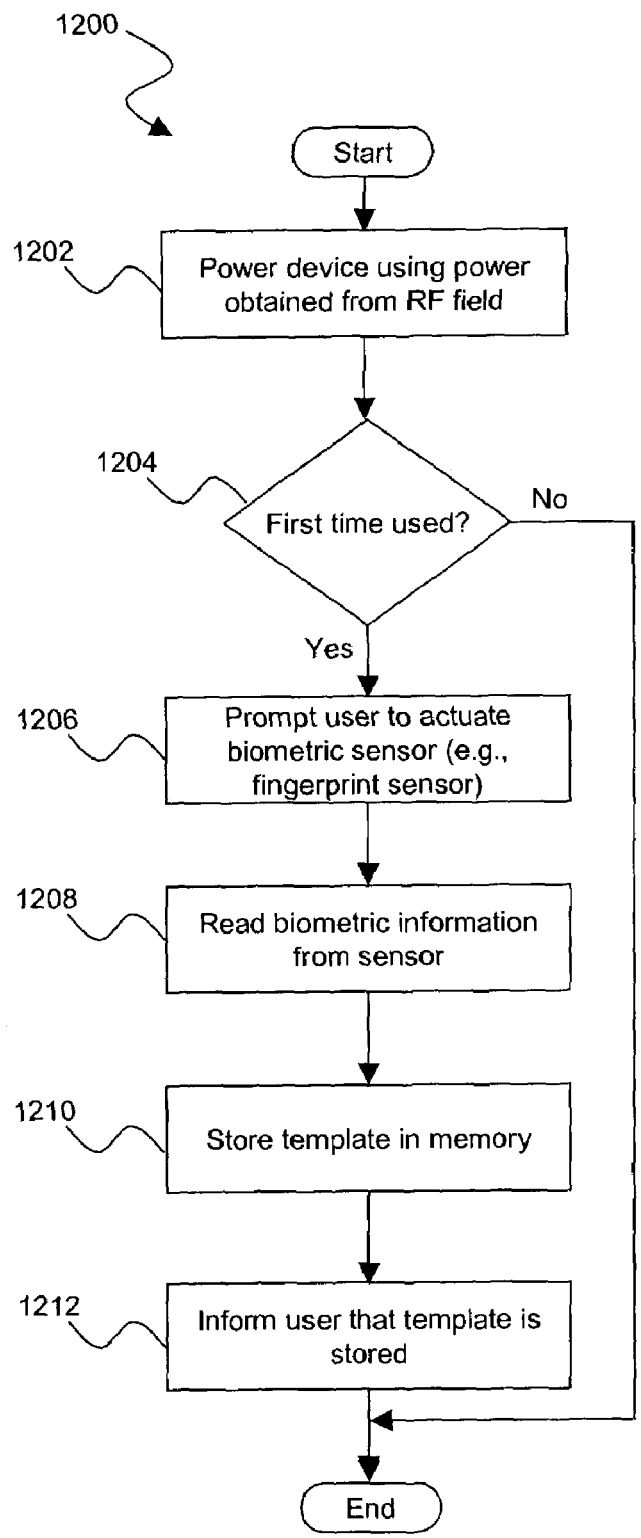
FIG. 12 is a flow chart of an exemplary method for storing a biometric template analog in the device of FIG. 1.
Figure 13:
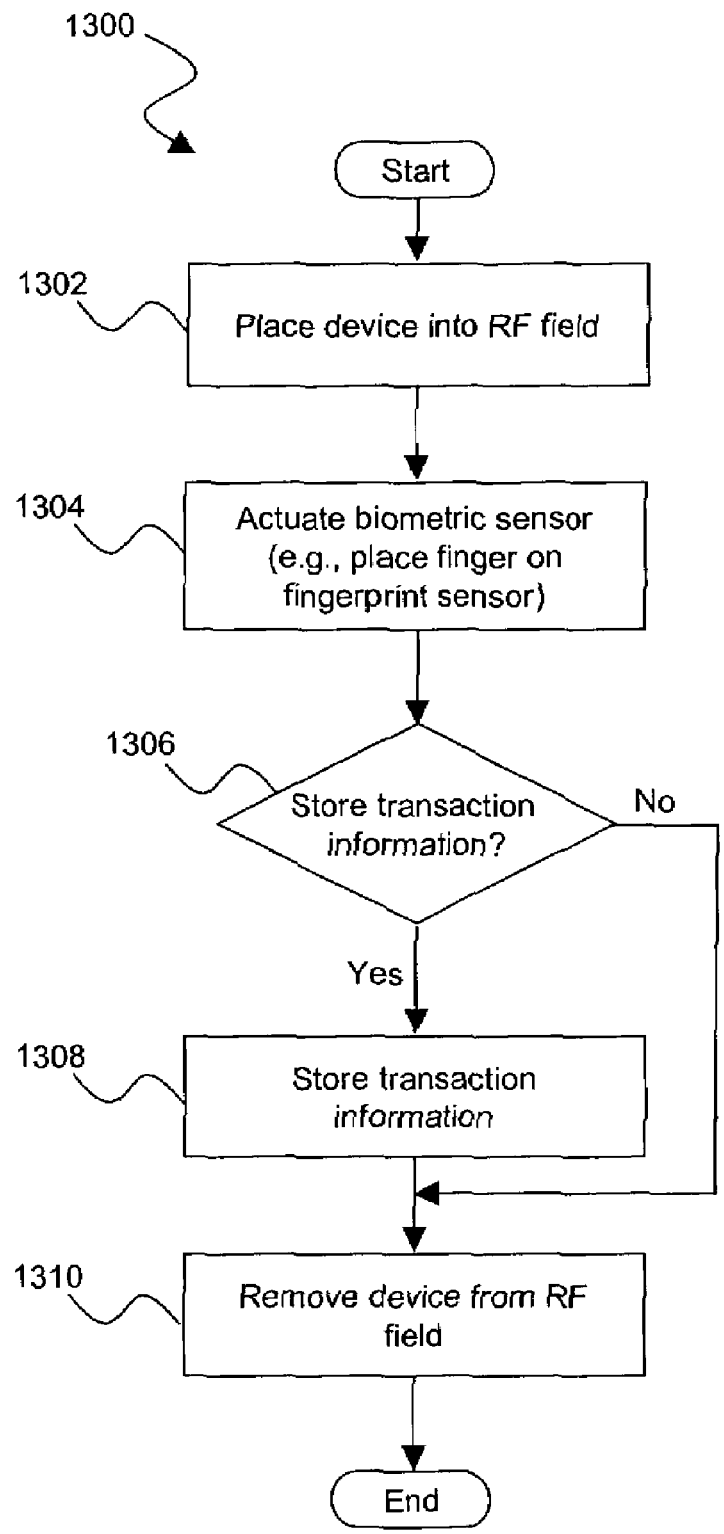
FIG. 13 is a flow chart of an exemplary method for using the device of FIG. 1 in a financial transaction.

Referring now to FIGS. 12 and 13, in another embodiment, methods 1200 and 1300 illustrate using the present disclosure in a financial transaction environment. The financial transaction environment includes making retail purchases in either a physical store or on-line (e.g., over the Internet). The present disclosure may be implemented in the financial transaction environment by using a device, such as the device 100 of FIG. 1, to identify buyers, verify the identity of the buyer rapidly in a localized venue, associate the buyer's identity with a credit or debit account, and/or assure the availability and legitimacy of funds in these accounts for payment transactions.

Payments for retail purchases are generally accomplished in one of three ways: with cash; with a check; or with a credit or debit card. In a cash transaction, there is generally no need for validating the identification of the buyer. In a transaction where a check is used, there generally is a need for identification of the buyer. This identification may occur by way of the buyer's presentation of a driver's license or alternate, approved identification card, presentation of a credit card to indicate credit-worthiness, or by a telecommunication connection to a check security processing service to assure funds availability for, and legitimacy of, the check presented for payment.

In a transaction where a credit or debit card is used, there are generally various procedural mechanisms in place to assure buyer identification and legitimate ownership of the card presented for the payment transaction. For example, the payment may require the entry of a numeric PIN (Personal Identification Number) security code by the buyer and assumed owner of the card. Alternatively, sales personnel may compare the buyer's signature on the back of the card presented for payment versus the requested signature on the purchase receipt provided for the goods or services purchased. In some cases, cards have a photograph of the card owner on them, and sales personnel may make cursory comparisons of this photograph with the buyer to establish identification. However, both photographic comparison and PIN-based card authorization have weaknesses for assuring identification, and both have potential risk for fraudulent processing. Photographs can be falsified and PIN numbers can be stolen. In the case of on-line purchases, buyers are not present to provide authorizing signatures, photographic comparisons cannot be made with existing processing infrastructure, and PIN-based transactions can be compromised with identity theft.

Referring specifically to FIG. 12, before the device 100 is usable in financial transactions, it should be initialized by the buyer/owner with the registration of a selected fingerprint pattern into secured memory of the device 100. To register a selected fingerprint, the device owner holds the device 100 in the RF field generated by a point of sale (POS) device, which may be a kiosk, personal computer, cash register, or similar device. The RF energy from the POS device provides for the power of the device 100 and display activation in step 1202. In step 1204, a determination is made as to whether the device 100 has been previously used. For example, the device 100 may determine if a fingerprint template analog is already stored in memory. If the device 100 has been previously used, the method 1200 ends. If the device has not been previously used, the device 100 continues to step 1206, where the owner is prompted to actuate the biometric sensor. For example, this may entail the owner briefly touching the biometric sensor 102 on the device 100 with a selected finger or thumb. The fingerprint information is read from the biometric sensor 102 and stored in the device 100 in steps 1208, 1210 while the owner maintains contact with the biometric sensor 102. The owner may maintain contact with the biometric sensor 102 until, in step 1212, an acknowledgement is displayed on the display 110 that the fingerprint pattern has been successfully registered in the device 100 as an encrypted template.

Referring specifically to FIG. 13, to authorize a payment transaction where invoice information is displayed by the POS device, the user of the device 100 holds the device 100 within an RF field generated by an RF reader connected to the POS device in step 1302. For example, the user may hold the device 110 at an approximate six inch distance from the RF reader. In step 1304, the user actuates the biometric sensor 102 (e.g., touches the fingerprint sensor with his/her finger or thumb) to effect a comparative match with his/her previously registered fingerprint securely stored in the memory of the card. A successful match effects an encrypted approval and transfer of cardholder account data to the seller's administrative accounts receivables processing system.

In step 1306, a determination is made as to whether the user desires to transfer electronic receipt information to the device 100. If not, the method 1300 continues to step 1310, where the device 100 is removed from the RF field. If it is determined in step 1306 that the user does want to transfer electronic receipt information to the device 100, the method 1300 continues to step 1308, where the device 100 stores the information in memory. The method 1300 may then continue to step 1308, where the device 100 is removed from the RF field.

While the preceding description shows and describes one or more embodiments, it will be understood by those skilled in the art that various changes in form and detail may be made therein without departing from the spirit and scope of the present disclosure. For example, the present disclosure may be implemented in a variety of form factors, such as a wristwatch or wristwatch band, a key ring, or a variety of other physical structures. Therefore, the claims should be interpreted in a broad manner, consistent with the present disclosure.

What is claimed is:

1. An apparatus comprising a flexible device having approximately the size and shape of a credit card, the device including circuitry and the circuitry including a biometric sensor that can detect biometric information associated with a user of the device, the biometric sensor being flexible;

wherein the device has an edge portion with approximately the size and shape of an edge portion of a credit card;

wherein the biometric sensor includes a fingerprint sensor; and wherein the circuitry further includes:

a flexible display;

memory that can store biometric template information and a plurality of account numbers;

a manually operable button;

a processor coupled to the fingerprint sensor, the display, the memory and the button, the processor being responsive to biometric input information from the fingerprint sensor for comparing the biometric input information with the biometric template information, and being responsive to manual operation of the button for selecting one of the account numbers in the memory;

a section that is coupled to the processor, that the processor can use to receive and transmit radio frequency signals, and that is responsive to electromagnetic fields external to the device for supplying operating power to other portions of the circuitry, the section including an antenna;

a part that is disposed on the portion of the device, that is coupled to the processor, and that under control of the processor can produce externally of the device a magnetic field readable by a magnetic strip reader; and a contact smart card chip coupled to the processor.

2. An apparatus according to claim 1, wherein the processor transmits through the section a communication that is a function of whether the stored biometric template information matches the biometric input information obtained with the biometric sensor.

3. An apparatus according to claim 1, wherein the processor effects variation of the magnetic field.

4. An apparatus according to claim 1, wherein the processor effects variation of the magnetic field as a function of biometric input information obtained with the biometric sensor.

5. An apparatus according to claim 1, wherein the processor effects variation of the magnetic field as a function of whether the stored biometric template information matches biometric input information obtained with the biometric sensor.

6. An apparatus according to claim 1, wherein the circuitry includes a rechargeable battery, the battery being recharged by the operating power produced by the section from external electromagnetic fields.

\* \* \* \* \*